3,403,046
METHOD OF FORMING A WATER VAPOR
PERMEABLE FILM AND COATING ON
A SUBSTRATE
Frederick H. Schwacke, Jr., Farmingdale, and Charles
Giannone, Brooklyn, N.Y., assignors to Interchemical
Corporation, New York, N.Y., a corporation of Ohio
No Drawing. Filed Oct. 8, 1965, Ser. No. 494,250
8 Claims. (Cl. 117—102)

This invention relates to a new method of coating substrates. More particularly it relates to a new method for producing tough breathable coatings and coated fabrics which are excellent leather substitutes. The materials produced by the method of this invention may be used as substitutes for leather, particularly the type of flexible leather that is used in the manufacture of garments and as uppers for boots and shoes, and in the preparation of such leather substitutes.

A good leather substitute should have several basic qualities:

(1) A hand like that of leather;
(2) A breathability approaching that of leather;
(3) A good scuff or abrasion resistance;
(4) The ability to withstand rather wide variations in temperature without change;
(5) Good resistance to permanent deformation through bending or creasing;
(6) Good tear strength or resistance to tearing; and
(7) Its top or exposed surface should have no visible pores.

We have found that we can produce a leather substitute having this combination of properties by a novel method which comprises coating the substrate, preferably a cloth, with a coating comprising a thermoplastic elastomeric polyurethane dissolved in a volatile solvent having a solidification point between 20 and 150° F. Then, the coating is frozen, that is it is cooled to about 10° C. below the solidification point of the solvent after which the solvent in the frozen coating is removed by sublimation at reduced pressure (under vacuum).

The polyurethanes used in the practice of this invention are thermoplastic elastomeric polyurethanes which are essentially linear in character. They may be prepared from long chain diols such as linear polyesters and polyethers having molecular weights ranging from about 400 to 6000 and diisocyanates. The polyurethanes may also include in addition to the diols and diisocyanates, "chain-extenders" which are active hydrogen-containing difunctional compounds such as glycols, diamines, amino-alcohols and water.

The polyesters used in the preparation of the polyesterurethanes are prepared from the esterification of such dicarboxylic acids as adipic, succinic, pimelic, suberic, azelaic and sebacic or their anhydrides with glycols such as ethylene glycol, butanediol-1,4, hexamethylenediol-1,6, and octamethylenediol-1,8. In general, the glycol has the formula $HO(CH_2)_xOH$ with $x$ preferably from 2 to 10.

The polyethers may be characterized by the formulation $HO(RO)_nH$ where R is a divalent alkylene radical and $n$ is preferably an integer such that the molecular weight of the polyether lies between 400 and 6000. These polyethers are conventionally known as polyalkyleneether glycols or hydroxyl poly (alkylene oxides). Some conventional polyethers which may be used are polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol and mixtures thereof. Polyglycols containing several different radicals in the molecular chain such as, for example the compound $HO(CH_2OC_2H_4O)_nH$ wherein $n$ is an integer greater than 1 may also be used.

The diisocyanates may be aromatic, aliphatic, cycloaliphatic or mixtures thereof. They include naphthalene 1,5-diisocyanate, tetramethylene-1,4-diisocyanate, hexamethylene - 1,6 - diisocyanate, decamethylene - 1,10-diisocyanate, cyclohexylene-1,4-diisocyanate, methylene bis (4-cyclohexyl isocyanate) and tetrahydronaphthylene diisocyanate. However, arylene diisocyanates are preferred. They include diphenyl diisocyanates such as a diphenyl methane diisocyanate, diphenyl methane-p,p′-diisocyanate, dichlorodiphenyl methane diisocyanate, dimethyl diphenyl methane diisocyanate, diphenyl dimethyl methane diisocyanate, bitolylene diisocyanate, diphenyl ether diisocyanate and the like of the formula

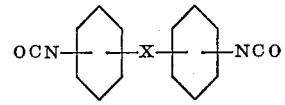

wherein X may be a valence bond, an alkylene radical containing preferably 1 to 5 carbon atoms, NR where R is an alkyl radical, oxygen, sulfur, $SO_2$ and the like; and the isocyanate groups are preferably in a para-position. Most preferred are the diphenyl methane diisocyanates and excellent results are obtained from diphenyl methane-p,p′-diisocyanate.

The polyurethanes may be "chain-extended" in the conventional manner by the conventional "chain-extenders" which have two active hydrogen atoms. The most preferable of the polyurethanes used in this invention are polyetherurethane and polyesterurethane in which glycols are used as "chain-extenders." The "chain-extension" is preferably carried out by adding the polyester or polyether to the glycols preliminary to adding the diisocyanate to the mixture and then reacting the components. While any conventional hydroxyl terminated glycol may be used for "chain-extension," the preferred glycols are straight chain glycols containing between 4 and 10 carbons such as butanediol-1,4-hexamethylene glycol or any of the other 4–10 carbon glycols set forth above.

The preferred "chain-extended" polyurethanes which have given good results when used in the practice of this invention are the polyesterurethanes described in U.S. Patent No. 2,871,218 and the polyetherurethanes described in U.S. Patent No. 2,899,411. The polyetherurethanes of U.S. Patent No. 2,899,411 are the reaction products of about 1 mole of polyalkyleneether glycol, about 0.5 to 9.0 moles of a 4 to 12 carbon atom aliphatic glycol and about from 1.5 to 10 moles of a diphenyl diisocyanate. The polyesterurethanes of U.S. Patent No. 2,871,218 are prepared by reacting one mole of polyester having a molecular weight of about 600 to 1200 with about 1.1 to 3.1 moles of a diphenyl diisocyanate in the presence of about 0.1 to 2.1 moles of a glycol containing about 4 to 10 carbons. In both the polyester-urethane and polyetherurethane of these patents, the molar amount of the diisocyanate reacted is essentially equal to the total molar amount of the polyester or polyether plus the molar amount of the glycol "chain-extender."

The polyurethanes may also be "chain-extended" with conventional diamine chain extenders such as hydrazine. Dimethyl piperazine and ethylene diamine may also be used.

Thermoplastic elastomeric polyurethanes which are not chain-extended will also be operable in the practice of this invention, e.g., the polyetherurethanes of U.S. Patent 2,927,905.

The solvent used may be selected from among the conventional solvents for polyurethanes such as the solvents set forth in Patent Nos. 2,871,218 and 2,899,411. The solvents will of course vary to some extent with the nature of polyurethane. However, the solvent selected preferably has a solidification or freezing point of from 20 to 150° F. In addition, in order that the solvent may be sublimed from the frozen coating as readily as possible, it is most preferable that the solvent have a vapor pressure of from 1 to 30 mm. mercury at its solidification or freezing point.

While the base which we now prefer is a woven textile, non-woven textiles are utilizable. Cotton textiles have produced good results. However, any of a wide variety of natural and synthetic textiles to which the coating will adhere firmly will give satisfactory results e.g., nylon, polyesters such as Dacron materials, materials of acrylics such as Orlon, vinyl chloride copolymers, cellulosics such as rayon and cellulose acetate as well as natural materials such as cotton, wool, ramie, hemp and linen.

The polyurethanes used in this invention preferably have a molecular weight of from 5000 to 300,000 and most preferably from 40,000 to 80,000.

The breathability or moisture vapor transmission (M.V.T.) of leather and of the coated fabrics made by our method can be expressed in numerical terms determined as follows: The specimen under investigation is placed over the mouth of a Payne cup, which is circular and has an area of 10 square centimeters, so that it completely covers the mouth. The Payne cup contains 9 g. of 8 mesh calcium chloride granules. The covered cup is weighed and then exposed for 24 hours to a relative humidity of 90%. The cup is weighed again after exposure and the gain in weight is noted. This gain in weight is the water vapor passing through 10 square centimeters in 24 hours. Thus, a specimen of leather which has passed 2 g. of water vapor in 24 hours, has a M.V.T. of 2 g./10 cm.²/24 hours. The M.V.T. values for leather and for our new leather substitute which are set forth herein are determined by following that procedure.

In the present specification and claims all proportions are by weight unless otherwise specified.

The following examples will illustrate the practice of this invention:

EXAMPLE 1

A polyesterurethane having a molecular weight of about 60,000 is prepared following the procedure set forth in U.S. Patent 2,871,218, col. 4, lines 13 to 27. A mixture of 1447 g. (1.704 mols) of hydroxyl poly(tetramethylene adipate), molecular weight 849, hydroxyl number 130.4, acid number 0.89 and 109.6 g. (1.218 mols) of butanediol-1,4 is melted in a four liter kettle and stirred with a spiral ribbon stirrer for about 20 minutes at a pressure of 5 to 6 mm. at 100 to 110° C. To this mixture, there is added 730 g. (2.92 mols) of diphenyl methane-p,p diisocyanate. This mixture is stirred for about 1 minute and is then poured into a lubricated one gallon can which is promptly sealed with a friction top and the can placed in a 140° C. oven for 3.5 hours. The product is then cooled. A 20% solution of the polyesterurethane in p-dioxane is prepared. p-Dioxane has a vapor pressure of about 18 mm. of mercury in the solid state at approximately 10° C.

The composition is then coated at a thickness of 1/16 inch onto the surface of a cotton sheet having a weight of 0.002 ounce per square inch. The temperature of the coating is immediately lowered to 10° C. or below, at which point the coating freezes or solidifies. The coated sheet is then dried for a period of about 12 hours at a temperature of below 10° C. and under a vacuum (pressure of less than 0.1 mm. of mercury).

The coated surface has a hand closely resembling that of a leather, excellent scuff and abrasion resistance and a moisture vapor transmission or breathability equal to that of leather.

The coated fabric of this example passed 2.8 g. of water vapor in 24 hours. The M.V.T. of the fabric may be set forth as 2.8 g./10 cm.²/24 hours as compared to leather which has an M.V.T. of 0.5 to 3.5 g./10 cm.²/24 hours depending upon the type of leather.

EXAMPLE 2

Example 1 is repeated using the same conditions, procedure and materials except that in place of the cotton sheet, the coating is applied to a plate glass surface and then solidified and dried in accordance with the procedure of Example 1. The resulting film is then removed from the glass plate.

The film has a hand closely resembling that of leather, good scuff and abrasion resistance and a moisture vapor transmission of 2.8 g./10 cm.²/24 hours. Its resistance to permanent deformation through creasing or bending or its resistance to tearing while better than that of some leathers is not as good as the coated fabrics produced in accordance with Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. A method of forming a tough water vapor permeable film which comprises
   (1) casting onto a support a coating comprising a thermoplastic elastomeric polyurethane dissolved in a volatile solvent, having a solidification point between 20 and 150° F.
   (2) cooling the coating until said coating solidifies and
   (3) then removing the solvent by sublimation at reduced pressure.

2. The method of claim 1 wherein the solvent has a vapor pressure of from 1 to 30 mm. of mercury in the solid state.

3. The method of applying a water vapor permeable coating onto a porous flexible base which comprises
   (1) covering a surface of said base with a coating comprising a thermoplastic elastomeric polyurethane dissolved in a volatile solvent having a solidification point between 20 and 150° F.
   (2) cooling the coating until said coating solidifies and
   (3) then removing the solvent by sublimation at reduced pressure.

4. The method of claim 3 wherein the solvent has a vapor pressure of from 1 to 30 mm. of mercury in the solid state.

5. The method of claim 3 wherein said polyurethane is a polyesterurethane.

6. The method of claim 5 wherein said polyesterurethane is an essentially linear polyesterurethane elastomer which is the reaction product obtained by heating a mixture comprising as essential polyurethane ingredients (1) one mole of an essentially linear hydroxyl terminated polyester of a saturated aliphatic glycol having from 4 to 10 carbon atoms and having hydroxyl groups on its terminal carbon atoms and a material selected from the group consisting of a dicarboxylic acid of the formula

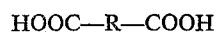

HOOC—R—COOH where R is an alkylene radical containing from 2 to 8 carbon atoms and its anhydride, said polyester having an average molecular weight between 600 and 1200 and having an acid number less than 10, and (2) from 1.1 to 3.1 mols of a diphenyl diisocyanate having an isocyanate group on each phenyl nucleus in the presence of (3) from about 0.1 to 2.1 mols of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no groups of the class consisting of isocyanate and hydroxyl groups in said reaction products.

7. The method of claim 6 wherein said polyesterurethane is a linear hydroxyl terminated polyester produced by the reaction of hydroxyl polytetramethylene adipate and butanediol-1,4, and said diisocyanate is diphenyl methane-p,p' diisocyanate.

8. The method of claim 3 wherein said volatile solvent is p-dioxane.

References Cited

UNITED STATES PATENTS

| | | | |
|---|---|---|---|
| 2,871,218 | 1/1959 | Schollenberger | 260—858 |
| 2,899,411 | 8/1959 | Schollenberger | 260—77.5 |
| 2,927,905 | 8/1960 | Eckert | 260—2.5 |
| 3,100,721 | 8/1963 | Holden | 117—135.5 |
| 3,208,875 | 9/1965 | Holden | 117—135.5 |
| 3,245,151 | 4/1966 | Eichmanns | 34—5 |

WILLIAM D. MARTIN, *Primary Examiner.*

T. G. DAVIS, *Assistant Examiner.*